United States Patent [19]
Borg et al.

[11] Patent Number: 5,813,026
[45] Date of Patent: Sep. 22, 1998

[54] PORTABLE ELECTRONIC DEVICE FOR INTERMITTENTLY EXECUTING A PROGRAM STORED ON TRANSPOSABLE MEMORY

[75] Inventors: Charles Borg, 1617-55 Harbour Square, Toronto, Ontario, Canada, M5J 2L1; Douglas Michael Marett, Toronto, Canada

[73] Assignee: Charles Borg, Toronto, Canada

[21] Appl. No.: 792,029

[22] Filed: Jan. 31, 1997

Related U.S. Application Data

[63] Continuation-in-part of Ser. No. 295,846, Aug. 31, 1994, Pat. No. 5,478,032.

[51] Int. Cl.⁶ ........................................... G06F 9/44
[52] U.S. Cl. ............................................. 711/115
[58] Field of Search ..................... 364/DIG. 1 MS, 364/DIG. 2 MS, 564; 368/281, 63, 10; 600/300, 437; 395/376, 381, 561; 711/1, 2, 3, 5, 100, 101, 102, 103, 115

[56] References Cited

U.S. PATENT DOCUMENTS

| | | | |
|---|---|---|---|
| 4,853,854 | 8/1989 | Behar | 364/569 |
| 5,285,430 | 2/1994 | Decker | 368/281 |
| 5,337,290 | 8/1994 | Ventimiglia | 368/10 |
| 5,398,688 | 3/1995 | Laniado | 600/437 |
| 5,412,560 | 5/1995 | Dennision | 600/300 |
| 5,444,673 | 8/1995 | Mathurin | 368/63 |
| 5,471,438 | 11/1995 | Kobayashi | 368/281 |

FOREIGN PATENT DOCUMENTS

| | | |
|---|---|---|
| WO92/12490 | 1/1992 | WIPO . |
| WO94/00831 | 5/1993 | WIPO . |

*Primary Examiner*—Robert B. Harrell
*Attorney, Agent, or Firm*—Riches, McKenzie & Herbert

[57] ABSTRACT

A portable electronic device is disclosed. The device has a first program stored in memory contained within the device and a second program stored on transposable memory which is releasably connectable to the device. The transposable memory comprises a plug-in module having a EEPROM. The second program stored on the transposable memory comprises a series of groups of instructions which are downloaded, as required, by the device and executed in order. The specific groups to be downloaded are determined by a jump table which accesses different groups of instructions in response to input signals. The instructions to be downloaded are identified by variable addresses in the jump table, and, the variable addresses are updated by means of the first program and the second program. In one embodiment, the device is a combination wrist watch and user interactive device such that the first program operates the wrist watch device and the second program comprises a behavioral modification program to assist the user to stop performing acquired behavioral responses such as using tobacco products, alcohol, or over-eating, in response to external stimuli.

20 Claims, 7 Drawing Sheets

| CONDITION | NEXT INSTRUCTIONS |
|---|---|
| Activation of activation button S2 | Load 128 bytes starting at memory location in the transposable memory identified by byte 125 of the first group of instructions into RAM 13, and execute this group of instructions |
| Activation of activation button S3 | Load 128 bytes starting at memory location in the transposable memory identified by byte 126 of the first group of instructions into RAM 13, and execute this group of instructions |
| Activation of activation button S4 | Load 128 bytes starting at memory location in the transposable memory identified by byte 127 of the first group of instructions into RAM 13, and execute this group of instructions |
| Has a time condition been satisfied | Execute instruction in memory location 00000100 in ROM 12 |

Fig. 5A

PORTABLE ELECTRONIC DEVICE FOR INTERMITTENTLY EXECUTING A PROGRAM STORED ON TRANSPOSABLE MEMORY

RELATED APPLICATIONS

This is a continuation-in-part application of U.S. application Ser. No. 08/295,846 filed Aug. 31, 1994, now U.S. Pat. No. 5,478,032.

FIELD OF THE INVENTION

This invention relates to portable electronic devices. More particularly, the invention relates to devices for executing a program stored within the device and intermittently executing computer instructions stored in a transposable memory.

BACKGROUND OF THE INVENTION

In the past, many electronic devices with external transposable memory have been offered. However, the external transposable memory in many cases could only be used to store data, and, could not be used to store instructions for execution by a processing unit in the electronic device.

Accordingly, the prior art suffers from several disadvantages. For example, prior art devices cannot execute programming instructions stored on transposable memory. This restricts interchangeability of the program instructions between electronic devices. In other words, the program to be executed by the prior art electronic devices is entirely stored in the memory contained within the device and cannot be easily transferred to another electronic device. In addition, the program instructions preloaded on the prior art devices relate to specific uses which are predetermined at the time of manufacture. This restricts the user to having one electronic device to execute one type of program and requires the user to obtain another electronic device to execute another type of program.

In addition, the prior art devices suffer from the disadvantage that the memory capacity of the device was limited. This meant that the amount of data and/or instructions in the computer program were limited.

In addition, the microprocessors used in many portable electronic devices have a program pointer which can only point to program memory stored within the electronic device and are not designed to point to instructions stored outside of the electronic device. Thus, even if the memory storage problem could be overcome, the microprocessors are still limited in their ability to access program instructions stored externally.

These disadvantages in the prior art are exacerbated when customized or specially designed software is to be executed. Moreover, if the specially designed software contains large amounts of graphics which are to be displayed, the number of instructions for each program increases, exceeding the memory capacity of the prior art devices.

Accordingly, there has been a need in the art for an electronic device which can access computer programming instructions stored externally of the electronic device in transposable memory. There has also been a need in the art for an alternative electronic device which can access stored program instructions, with or without data, in a transposable memory source that can be easily connected and disconnected to the electronic device and other similar electronic devices. There has also been a need for a device which can store data, along with instructions from a program, on transposable memory so that the instructions from the program and the data can be accessed by a host computer for downloading, analysis. Also, programs can be customized and transferred out of the device.

SUMMARY OF THE INVENTION

Accordingly, it is an object of this invention to at least partially overcome the disadvantages of the prior art. Also, it is an object of this invention to provide a portable electronic device that has transposable interchangeable memory containing program instructions so that different types of programs can be operated on the same electronic device by changing the transposable memory.

It is also an object of the present invention to collect and store in the transposable memory data which has been acquired within the frame work of the program stored in the transposable memory. This permits later downloading and analysis of the data, as well as customization and manipulation of the program stored in the transposable memory by a host computer.

Accordingly, in one of its aspects, this invention relates to a portable electronic device for executing a first program comprising instructions and intermittently executing instructions of a second program, said device comprising: processing means for executing the first program and the second program; memory means for storing and retrieving data and instructions, said memory means comprising memory locations identified by addresses; transposable non-volatile memory means for storing and retrieving data and instructions and having stored thereon the second program, said transposable memory means comprising memory locations identified by addresses; user-activatable input means for generating and sending input signals to the processing means upon activation by a user; a body case for containing the processing means, input means and memory means, said body case comprising connecting means for releasably connecting the transposable memory means to the body case and releasably electrically coupling the transposable memory means to the processing means; wherein upon activation of the device, the first program is stored in the memory means and the processing means commences execution of the first program; wherein when the transposable memory means is coupled to the processing means, receipt of an input signal by the processing means causes the processing means to transfer a first group of instructions of the second program from the transposable memory means to the memory means and execute the first group of instructions.

In a further aspect, the present invention relates to a portable electronic device which has a display and a wrist watch like casing such that a first program stored on the memory within the device operates the device as a wrist watch, and, a second program stored on the transposable memory provides instructions to operate a behavioral modification program. In this embodiment, the invention provides a monitoring device which monitors the activities of the user, and records and tabulates the user's activities with the corresponding time and date of the occurrence of the activities. These records can be stored in the wrist watch device, the transposable memory or both.

In one embodiment, the device executes instructions which monitor the user's responses to urges to perform acquired behavioral responses, such as eating or smoking, or to monitor and record events, such as improvements in golf scores. The device can interchangeably execute programs relating to eating, smoking or keeping golf scores by interchanging the transposable memory.

Further aspects of the invention become apparent upon reading the following detailed description and the drawings which illustrate the invention and preferred embodiments of the invention.

BRIEF DESCRIPTION OF THE DRAWINGS

In the drawings, which illustrate embodiments of the invention:

FIG. 5A shows a jump table according to one embodiment of the present invention;

DETAILED DESCRIPTION OF THE PREFERRED EMBODIMENTS

Figure 1:
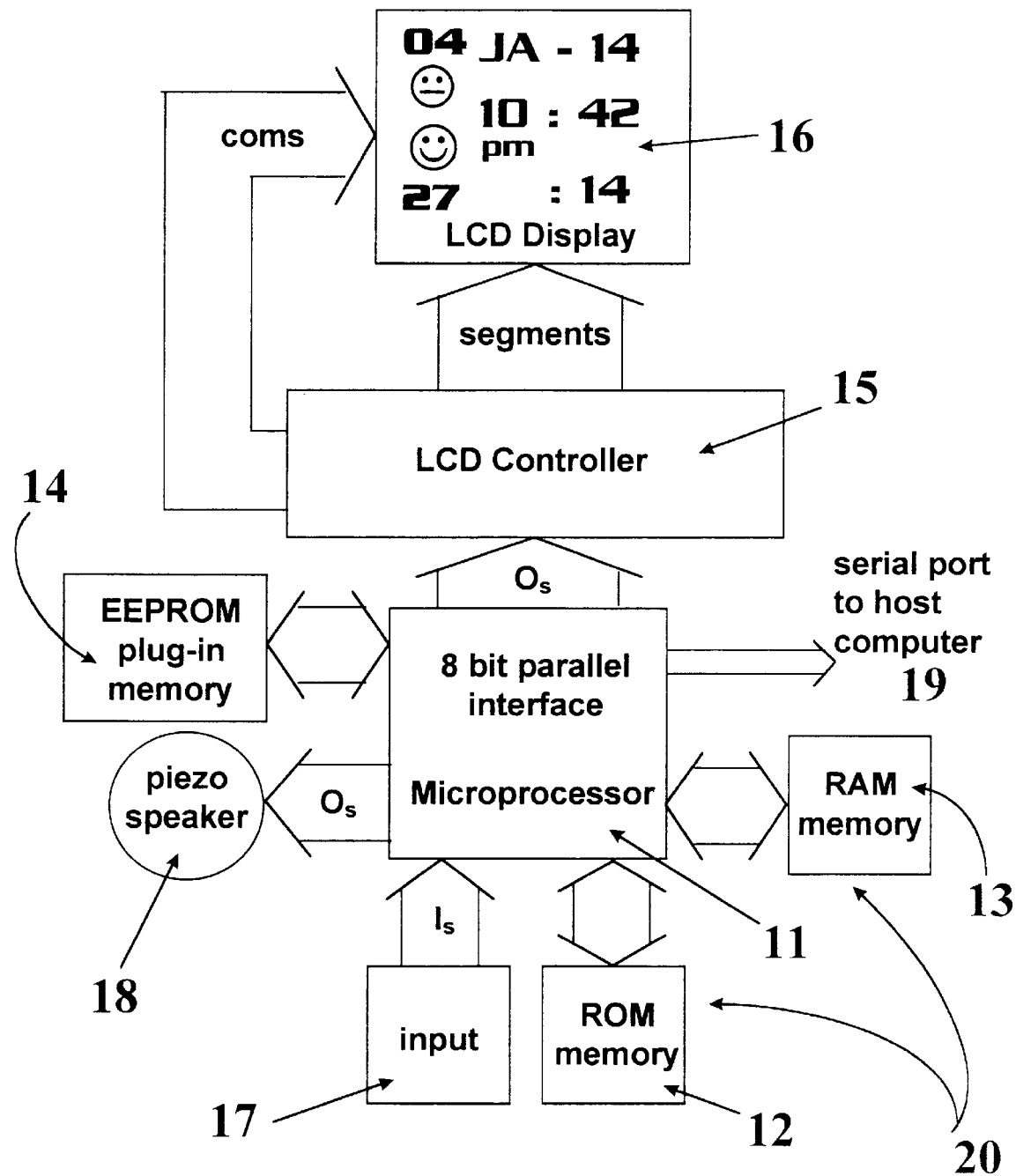
FIG. 1 shows a block diagram of the device according to one embodiment of the present invention.

FIG. 1 shows a block diagram of a device, shown generally by reference numeral 10, according to one embodiment of the present invention. As shown in FIG. 1, the device 10 comprises a processor 11. The processor 11 can process program instructions.

The device 10 further comprises memory 20. In a preferred embodiment, the memory 20 comprises non-volatile read only memory (ROM) 12 and volatile random access memory (RAM) 13. The memory 20 is located within the device 10.

The device 10 further comprises transposable non-volatile memory 14. The transposable memory 14 in one preferred embodiment comprises an electrically erasable programmable read only memory (EEPROM) which can be plugged into a body case 22 for the device 10.

The memory 20 and the transposable memory 14 both comprise memory locations which are identified by unique addresses, as is known in the art. Both the memory 20 and the transposable memory 14 can store and retrieve data and computer programming instructions.

Upon activation of the device 10, the memory 20 has a first program stored therein. Preferably, the first program will be stored in the non-volatile ROM memory 12 so that it can be retained when the device 10 is not activated. Instructions of a second program are stored on the transposable memory 14. The first program can operate independently of the second program, such that the device 10 can execute the instructions from the first program stored in the memory 20, whether or not the transposable memory 14 has been connected to the device 10.

The device 10 further comprises a user-activatable input 17. The input 17 sends input signals $I_S$ upon activation by the user.

In a preferred embodiment, the device 10 comprises output means. For example, as shown in FIG. 1, the device 10 can comprise a liquid crystal display (LCD) 16 which is driven by COMS and segments signals from an LCD controller 15. The LCD controller 15 in turn receives output signals $O_S$ from the processor 11. Likewise, the device 10 can comprise a piezo speaker 18 which emits audible sounds in response to output signals $O_S$ from the processor 11.

Figure 2:
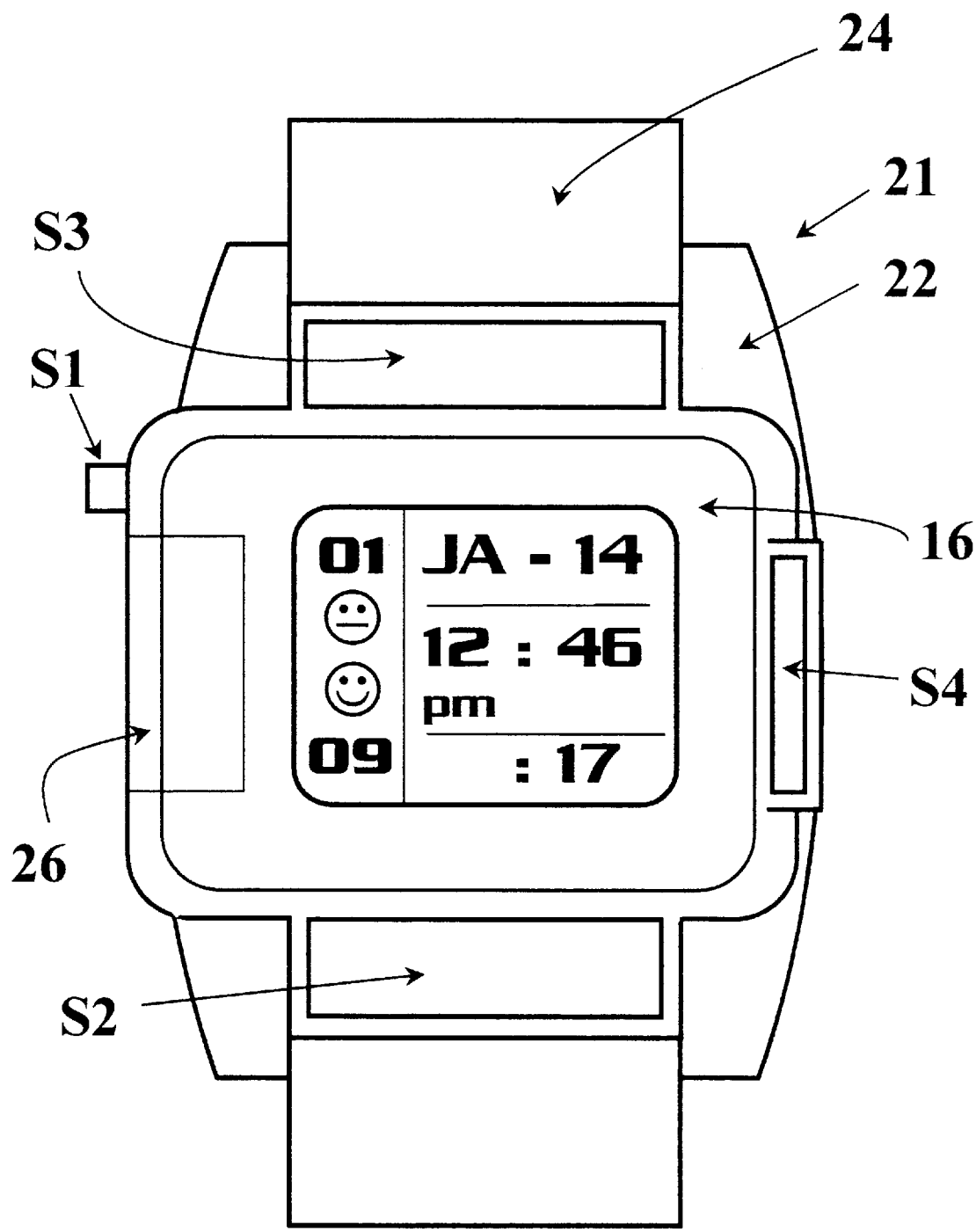
FIG. 2 shows an embodiment of the present invention wherein the device is a combination wrist watch and user-interactive monitoring device.

The device 10 further comprises a body case 22 for containing the processor 11, input 17, memory 20, and if applicable, the output devices such as the display 16, LCD controller 15 and piezo speaker 18. In a preferred embodiment, as shown in FIG. 2, the device 10 is a combination wrist watch and user-interactive monitoring device. In this embodiment, the device 10 has a body case 22 which is similar to a wrist watch. In addition, the device 10 has a fastening device 24 for fastening the device 10 to the user's wrist, as in the case of a conventional wrist watch. In this embodiment, the body case 22 is a watch case which contains the memory 20, processor 11, input 17 and the display 16, LCD controller 15 and piezo speaker 18. In FIG. 2, only the display 16 is visible.

The user-activated input 17 in FIG. 2 is shown by the activation buttons S1, S2, S3 and S4. The activation buttons S2, S3 and S4 are larger and located on the front of the wrist watch.

The body case 22 further comprises a connecting means 26 for releasably connecting the transposable memory 14 to the body case 22, and, releasably electrically coupling the transposable memory 14 to the processor 11 as shown in FIG. 1. Once the transposable memory 14 is mechanically connected to the body case 22 and electrically coupled to the processor 11, data and instructions can be transferred to and from the processor 11 and the transposable memory 14.

Figure 3:
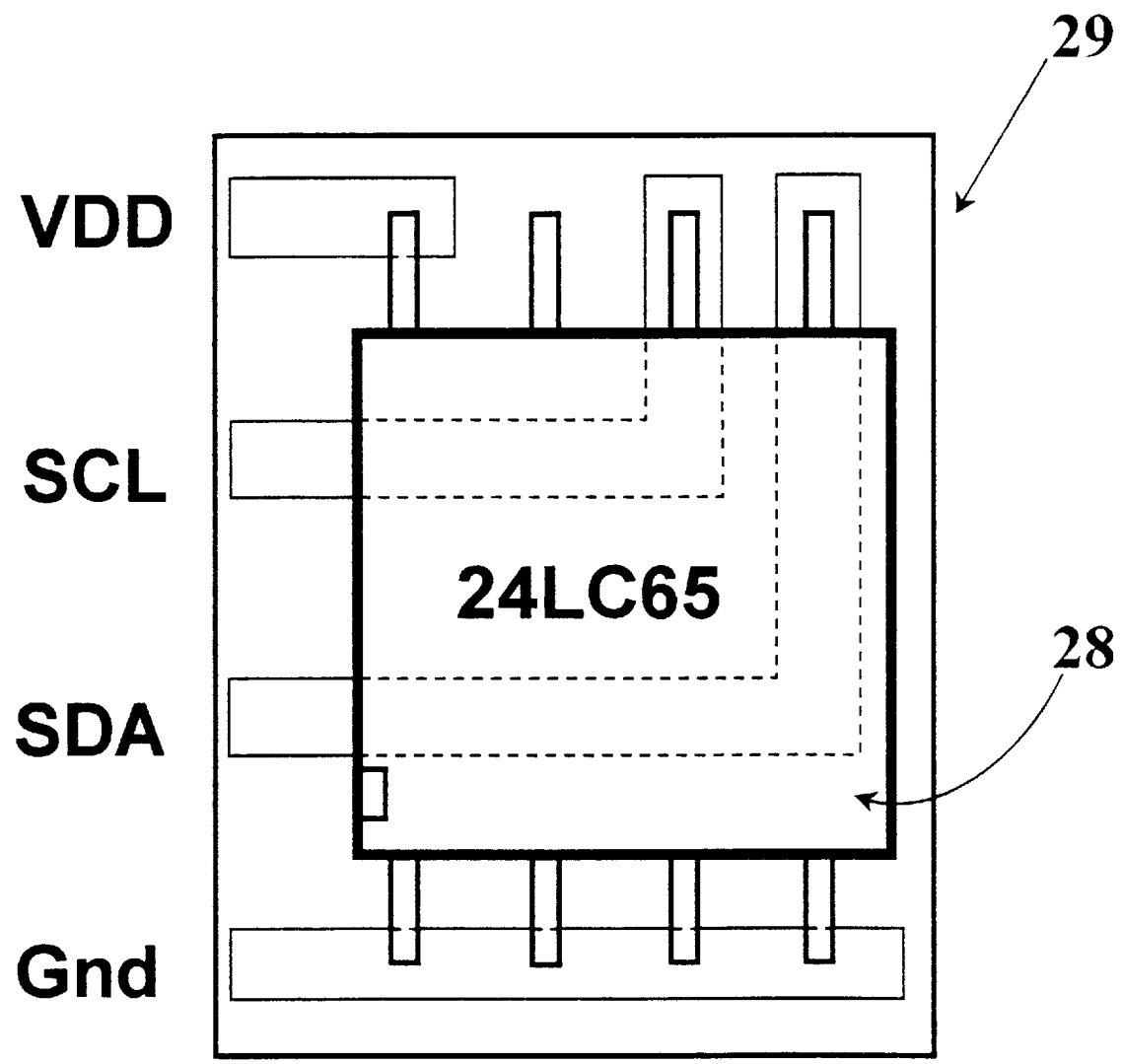
FIG. 3 shows a circuit diagram of the transposable memory plug-in module upon which the transposable memory is located.

FIG. 3 shows a circuit diagram of the transposable memory 14. In a preferred embodiment, as shown in FIG. 3, the transposable memory 14 is a 24LC65 chip 28 manufactured by Microchip Technologies. The I$^2$C protocol 8 pin chips, such as the 24LC65 chip 28, and the other 24XXXX series chips from Microchip Technologies, are preferred because they require a small number of pin connections, which in this embodiment are only four, and they are small in size and not complex. The four pin connections are the signal pins SDA and SCL and the power pins, namely power VDD and ground Gnd. Data can be conveniently written or read from the transposable memory 14 using a simple "bit bang" software routine which toggles the SDA and SCL lines high and low for asynchronous communication as is known in the art.

Figure 4A:
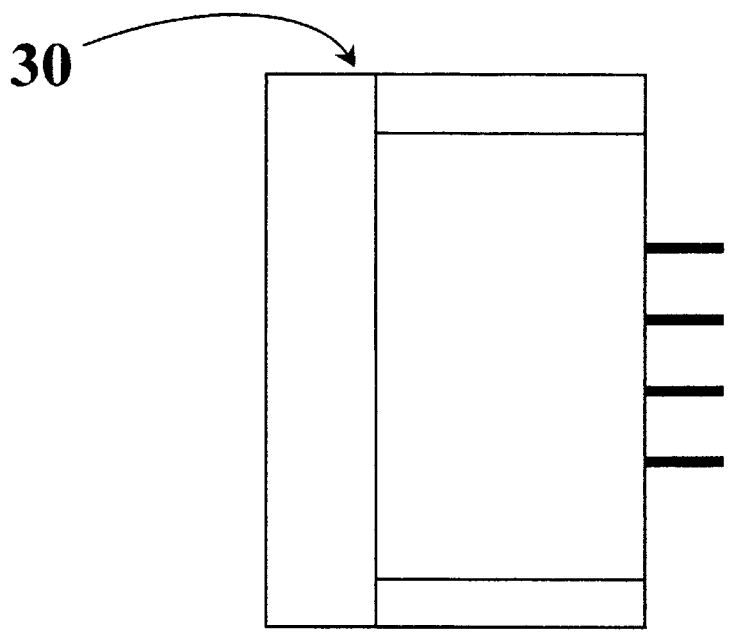
FIGS. 4A and 4B show a top view and a side view, respectively, of the plug-in module according to one embodiment of the invention.
Figure 4B:
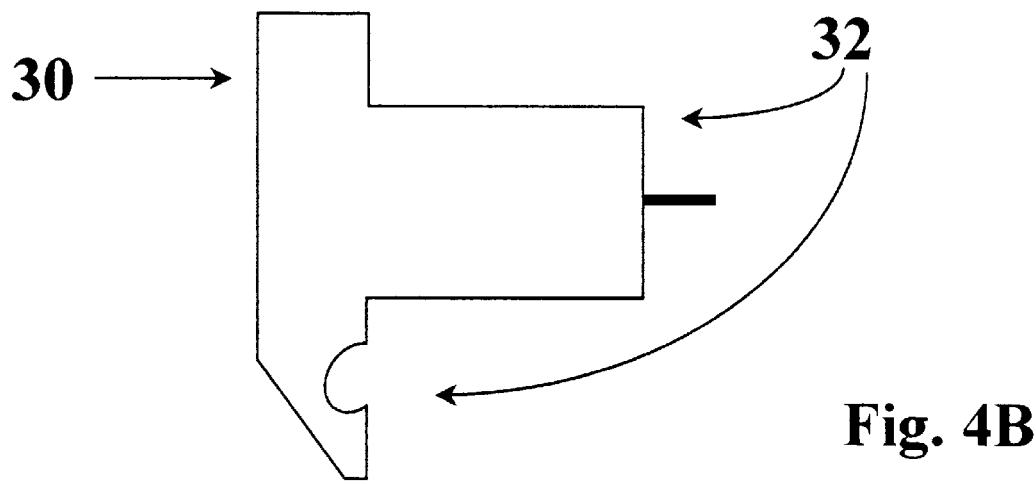

In a preferred embodiment where a 24LC65 chip 28 is used, or another small memory chip is used, the chip 28 and the printed circuit board 29 upon which the chip 28 is affixed can be encapsulated in a protective plug-in module 30, shown in FIGS. 4A and 4B. The module 30 can be releasably connected to the connecting means 26 on the body case 22. The plug-in module 30 preferably contains retaining means, shown generally by reference numeral 32 in FIG. 4B, which mechanically mates with the connecting means 26 on the body case 22 to releasably connect the transposable memory 14 to the body case 22. When the plug-in module 30 is mechanically connected to the connecting means 26, the circuit board 29 is electrically connected to the processor 11, thereby electrically coupling the transposable memory 14 to the processor 11.

When the transposable memory 14 is electrically coupled to the processor 11, the processor 11 transfers a first group of instructions of the second program from the transposable memory 14 to the memory 20 in the device 10 and executes the first group of instructions upon receipt of an input signal $I_S$. The input signal $I_S$ can result from the user pressing one of the input activation buttons S1, S2, S3 or S4. To avoid accidental triggering, the processor 11 will transfer the first group of data only if one of the activation means, such as S2, is pressed for one to two seconds.

Preferably, the first group of instructions is transferred to the volatile memory 13 of the memory 20. Also, it is preferable that the second program be separated into several groups of instructions. Each group of instructions should be about equal in length so that each group of instructions can be stored in about an equal number of memory locations in the transposable memory 14. This allows for simplified transference between the transposable memory 14 and the volatile memory 13. It is apparent that the volatile memory 13 should have sufficient memory locations to store at least one of the groups of instructions of the second program but need not be large enough to store all of the groups of instructions of the second program. Also, if the groups of instructions are not equal in size, the volatile memory 13 should have sufficient memory locations to store at least the largest group of instructions of the second program. In a preferred embodiment, each group of instructions is 128 bytes in size and occupies 128 memory locations in both the transposable memory 14 and the memory 20.

Each group of instructions of the second program, including the first group of instructions, comprises next instructions. The next instructions are generally located at the end of the group of instructions and instruct the processor 11 which instructions to execute next. In other words, the next instructions can instruct the processor 11 to execute instructions from the first program stored in the memory 20, or to transfer other groups of instructions of the second program from the transposable memory 14 to the memory 20 and execute those additional groups of instructions.

For example, if the first group of instructions only comprise 128 bytes, but the instructions to be executed by the second program upon receipt of the input signal $I_S$ constitutes more than 128 bytes, the next instructions in the first group of instructions can instruct the processor 11 to transfer another group of instructions of the second program from the transposable memory 14 to the memory 20 and execute the other groups of instructions. This can be the case, for example, if the first group of instructions constitutes a part of an image to be displayed on the display 16, but all of the image information cannot be transferred in the first group of instructions from the transposable memory 14 to the memory 20. In this case, the final instruction in the first group of instructions would instruct the processor 11 to transfer another group of instructions of the second program containing the remaining instructions to complete the image. In a further example, the second program may be designed to alternate images on the display 16. In this case, the first group of instructions can display the first image and the next instructions can instruct the processor 11 to transfer another group of instructions from the transposable memory 14 and display the second image after the first image has been displayed for a predetermined period of time.

In addition, the next instructions can be conditional, in that the processor 11 will execute different instructions depending on satisfaction of a condition, such as activation of one of the activation buttons S2, S3 or S4. To accomplish this, in one embodiment, the device 10 comprises a jump table 40 comprising a plurality of conditions and a corresponding plurality of variable addresses, such that each condition is associated with only one variable address. The variable addresses identify a memory location in the memory 20 or the transposable memory 14 which contains the next instructions, namely the instructions to be executed by the processor 11 if the associated condition is met. The associated conditions can correspond to activation of one of the activation buttons S2, S3 or S4. The associated condition can also be a time condition which is satisfied if no input signals $I_S$ are generated in a predetermined time period, corresponding to none of the activation buttons S2, S3 or S4 having been activated.

One example of a jump table 40 is shown in FIG. 5A. In FIG. 5A, a set of four conditions appear in the first column. These conditions correspond to activation of activation buttons S2, S3 or S4, and, a time condition having been satisfied if none of activation buttons S2, S3 or S4 are pressed in a predetermined time period. If one of these conditions is satisfied, the corresponding next instructions would be executed.

For example, if activation button S2 is activated, the processor 11 will go to the memory location in the transposable memory 14 identified by byte 125 of the first group of instructions from the second program and sequentially transfer 128 bytes starting at that memory location into the RAM 13. At that time, the processor 11 will execute those 128 bytes of instructions which are another group of instructions of the second program. If activation buttons S3 or S4 are activated, the processor 11 will also load another group of 128 bytes of instructions of the second program, but those other groups will be sequentially located commencing at the memory location identified by byte 126 or byte 127, respectively.

It is apparent that subsequent groups of instructions can up-date the corresponding variable memory locations at which the next groups of instructions will commence. By up-dating the jump table 40 in this way, different groups of instructions can be executed each time the activation buttons S1, S2, S3 and S4 are activated.

If a time condition is satisfied such that none of the activation buttons S2, S3, S4 are activated within a predetermined time period, the processor 11 will execute an instruction in a memory location, such as 00000100 as shown in FIG. 5A. Memory location 00000100 identifies a memory location in the non-volatile memory ROM 12, and in this embodiment, corresponds to instructions from the first program. In other words, if none of the activation buttons S2, S3 or S4 are activated in a predetermined time period, the jump table 40 as set in FIG. 5A will return the device 10 to instructions of the first program, such as displaying the time of day in the embodiment where the device 10 is a wrist watch, which commence at memory location 00000100.

It is apparent that the jump table 40 can be continuously up-dated by the group of instructions from the second program and/or instructions of the first program. For example, the jump table 40, during operation of the first program, could simply be set so that activation of activation button S2 causes the processor 11 to transfer 128 bytes of instructions starting at memory location 00000000 in the transposable memory 14, representing the first group of instructions of the second program, into volatile memory RAM 13 and execute the instructions. In this case, the jump table 40 need not have any other conditions. The first group of instructions will have next instructions which can up-date the jump table 40 and/or instruct the processor 11 which instructions to execute next.

In a further embodiment, the jump table 40 can include next instructions which record which activation buttons S2, S3 or S4 have been activated, along with the time and date of activation. This data is stored in the volatile memory RAM 13. This data will eventually be copied from the volatile memory RAM 13 to the transposable memory 14 for later retrieval and analysis. The instructions to transfer the data from the volatile memory RAM 13 to the transposable memory 14 can be instructions in the first program, the second program or both.

As is apparent from FIG. 5A, the instructions on the transposable memory 14 in this embodiment are transferred to the volatile memory RAM 13 and are executed from there. The non-volatile memory ROM 12 stores the instructions of the first program so that the instructions are retained during a power out condition.

The jump table 40 represents how the device 10 can access different groups of instructions of the second program in response to conditions being met, such as the activation or non-activation of the activation buttons S1, S2, S3 and S4. It is understood that the jump table 40 can be created by software, hardware, or a combination of both. In addition, it is understood that the jump table 40 could comprise software instructions from the first program and or the second program. As shown in jump table 40, the variable addresses identifying the next instructions can be simply memory locations in the volatile memory 13 corresponding to different bytes which have been transferred from the transposable memory 14. For example, the memory location in byte 125 shown in jump table 40, corresponds to the memory location in the volatile memory 13 wherein the 125th byte of data was transferred from the transposable memory 14.

In a preferred embodiment, as discussed above, the device 10 is a combination wrist watch and user-interactive monitoring device. In this embodiment, the processor 11 further acts as a clock to measure time. The first program in this embodiment operates the device 10 as a watch by displaying the time which is measured by the processor 11. The first program also may comprise alarm functions and chronograph functions, as would be the case with any conventional watch.

In a further preferred embodiment, device 10 comprises a behavioral modification program for promoting alternative responses to acquired behavioral responses. In this embodiment, the second program comprises this behavioral modification program.

A behavioral modification program which can be executed as the second program is disclosed in co-pending U.S. application Ser. No. 08/285,846 filed Aug. 31, 1994 and is incorporated herein by reference. The behavioral modification program is activated by the user by activating one of the activation buttons, such as activation button S2. At that time, a series of symbols or images, shown in FIG. 6 by reference numeral 62, are displayed.

Figure 5B:
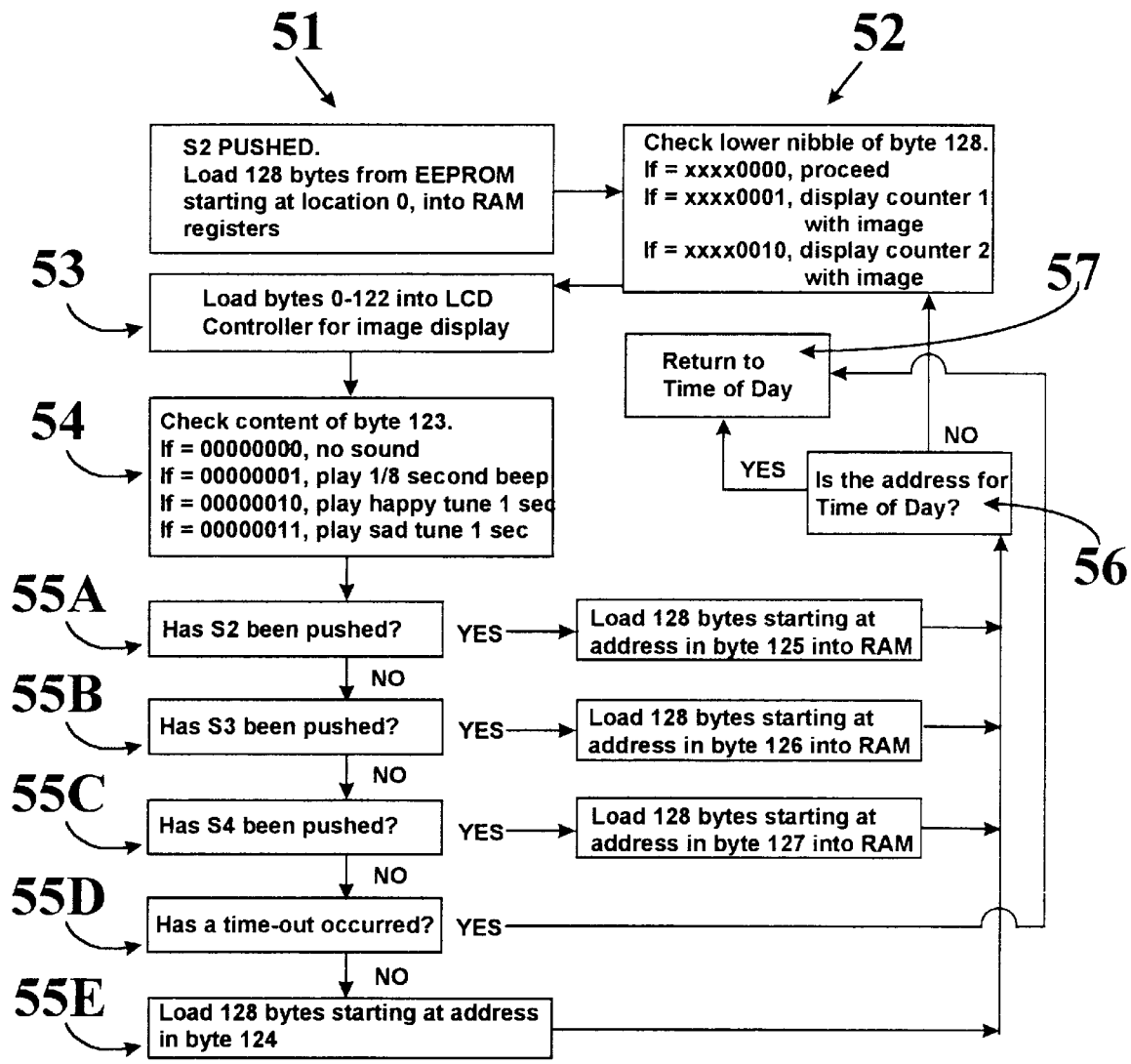
FIG. 5B shows a flow chart illustrating execution of one group of instructions of the second program according to one embodiment of the present invention.

FIG. 5B shows a flow chart for executing a first group of instructions of the second program where the second program is a behavioral modification program. As shown in FIG. 5B, the first group of 128 bytes of instructions of the second program are transferred from a first address in the transposable memory 14 upon activation of activation button S2. This step is shown by step 51 in FIG. 5B. The first address, in the embodiment shown in FIG. 5B, is memory location 0 in the transposable memory 14, namely the EEPROM. These 128 bytes of data are transferred to the volatile memory RAM 13 of the device 10 from memory locations 0 to 127 in the transposable memory 14.

Once the 128 bytes of the first group of instructions have been transferred to the volatile memory 13, the lower nibble, or 4 bits, of byte 128 of the 128 bytes is checked to determine how the first group of instructions should be executed. This is shown in step 52 of FIG. 5B.

If the lower nibble is all zeros, the instructions will be executed. In FIG. 5B, the next step is for the image represented by bytes 0 to 122 to be displayed on the display 6, as shown in step 53 of FIG. 5B. This is done by the processor loading the instructions from bytes 0 to 122, of the second program, which have now been stored in the volatile memory 13 into the LCD controller 15 for display on the display 16. If the lower nibble had been something else, such as 0001 or 0010, the symbol or image would have been displayed along with a counter.

In a preferred embodiment, byte 123 indicates what sound should be heard by the piezo speaker 18 as shown by step 54. The value of byte 123 indicates which one of the different sounds stored in the memory 20 should be played as shown in FIG. 5B.

Steps 55A, 55B, 55C and 55D reset the jump table 40 for execution of the next instructions depending on activation of one of activation buttons S2, S3 or S4. Steps 55A, 55B, 55C and 55D set the jump table 40 to the condition as shown in FIG. 5A. The default condition 55E loads the group of 128 bytes starting at the address identified in byte 124. If any of the addresses identified by these bytes correspond to the address for time of day, then the second program ceases and instructions of the first program are executed as shown by step 56 returning to the time of day (step 57).

Figure 6:
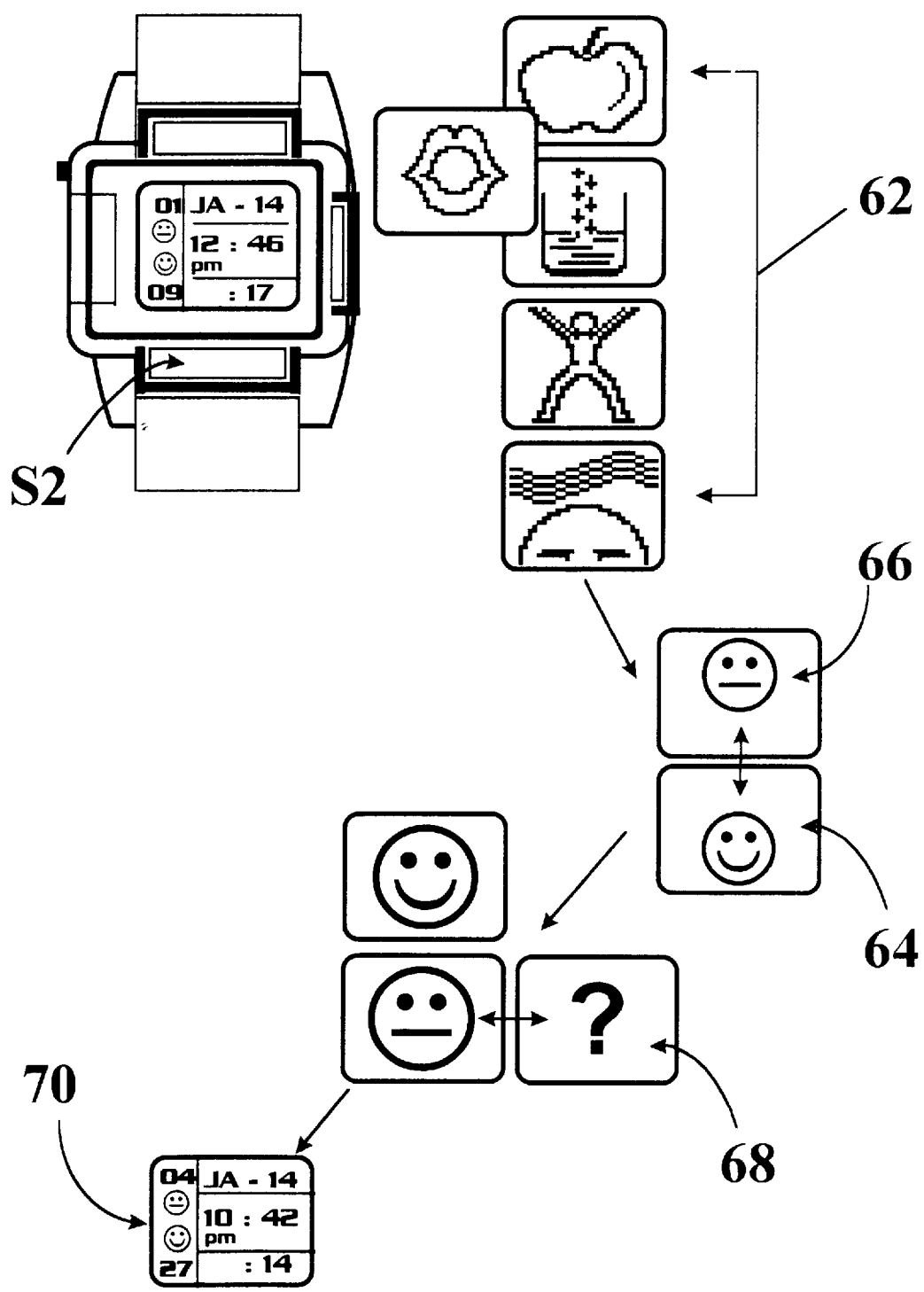
FIG. 6 shows the images displayed by the device during execution as a series of groups of instructions of a second program.

FIG. 6 shows the display of the symbols or images 62 of the behavioral modification program. As shown in FIG. 6, upon initial activation, a series of five images 62 representing alternative responses to the acquired behavioral response are shown. These five symbols 62 represent alternatives response which the user can perform rather than perform the acquired behavioral response. The symbols 62 represent taking a deep breath, eating an apple, drinking water, exercising or taking a nap, respectively. These images are sequentially stored in the transposable memory 14 and are transferred from the transposable memory 14 to the volatile memory 13 and are displayed as discussed above.

After the alternate response images 62 are displayed the device 10 transfers a group of instructions from the transposable memory 14 to alternately display a positive symbol 64, such as a "happy face", and a negative symbol 66, such as a "serious face". The jump table 40 is re-set at this time by one of these groups of instructions so that activation of activation button S2 identifies a group of instructions of the second program sequentially stored in the transposable memory 14 which instruct the processor 11 to display a positive symbol and play a happy tune. The jump table 40 is also re-set by one of these groups of instructions so that activation of activation button S3 identifies a group of instructions of the second program sequentially stored in the transposable memory 14 which instruct the processor 11 to display a negative symbol and play a sad tune. The user then indicates whether the user has selected one of the alternative behavioral responses or the acquired behavioral response by activating the activation button S2 or activation button S3, respectively. The corresponding group of instructions are then executed to display the symbols.

In a preferred embodiment, if the acquired behavioral response is selected, a group of instructions to display a question mark sign 68 alternating with the serious face will be transferred from the transposable memory 14 and executed. This gives the user an opportunity to reconsider the selection. When the acquired response is selected, the device 10 will play a sad tune.

In a further preferred embodiment, selection of the acquired response or the alternative response will allow the user to record the nature of the section. For example, if the acquired behavioral response for which the modification program has been developed is over-eating, the user will be able to specify what was eaten and the estimated calories by activating buttons S2, S3 and S4 to manipulate different menus. In this way a constant record of the food consumed can be kept. Likewise, if the alternative response is selected, the user can specify the type of alternative response, and, information about the alternative response. For example if exercise was selected, the user could record the intensity of the exercise and the duration by activating buttons S2, S3 and S4 to manipulate different menus.

In either case, the user selection will be recorded in the volatile memory 13 and transferred to the transposable memory 14. Furthermore, the processor 11 will automatically record the time and date of the urge and the response for later analysis and tabulation. Also, the display will display a total of acquired behavioral responses and alternative responses in a split screen with the time as shown in image 70 of FIG. 6.

The transposable memory 14 can be connected to another device 10 having an identical connection means 26. In this way, the user can utilize the same program on different devices 10. Likewise, different transposable memories 14 can be connected to the connection 26 of the device 10 so that different programs can be run on the same device.

The different programs can be tailored for the individual. For example, if the acquired behavioral response is over-eating, then the alternative response symbols 62 which will be displayed can be selected for over-eating. Likewise, if the acquired behavioral response is smoking, the alternative response symbols 62 selected can be customized for alternatives to smoking. Also, the alternative responses and/or the menus can reflect the preferences of the user.

In addition, the second program can operate other types of user-interactive monitoring programs, such as tabulating exercise patterns or golfing scores.

In a further preferred embodiment, the device 10 has a serial port 19 shown in FIG. 1. The serial port allows the information stored in the volatile memory 13 or the transposable memory 14 to be transferred to a host computer (not shown). Preferably an RS232 converter is used to transfer information to the host computer (not shown).

In a further embodiment, the plug-in module 30 can be connected to an adapter comprising another processor 11 which in turn is connected to the host computer (not shown). In this way, the information can be transferred from the transposable memory directly to the host computer(not shown) without the device 10, such as for tabulation and analysis.

It will be understood that, although various features of the invention have been described with respect to one or another of the embodiments of the invention, the various features and embodiments of the invention may be combined or used in conjunction with other features or embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, mechanical or electrical equivalents of a the specific embodiments and features that have been described and illustrated herein.

The embodiments of the invention in which an exclusive property or privilege is claimed are defined as follows:

1. A portable electronic device for executing a first program comprising instructions and intermittently executing instructions of a second program, said device comprising:
   processing means for executing the first program and the second program;
   memory means for storing and retrieving data and instructions, said memory means comprising memory locations identified by addresses;
   transposable non-volatile memory means for storing and retrieving data and instructions and having stored thereon the second program, said transposable memory means comprising memory locations identified by addresses;
   user-activatable input means for generating and sending input signals to the processing means upon activation by a user;
   a body case for containing the processing means, input means and memory means, said body case comprising connecting means for releasably connecting the transposable memory means to the body case and releasably electrically coupling the transposable memory means to the processing means;
   wherein upon activation of the device, the first program is stored in the memory means and the processing means commences execution of the first program;
   wherein when the transposable memory means is coupled to the processing means, receipt of an input signal by the processing means causes the processing means to transfer a first group of instructions of the second program from the transposable memory means to the memory means and execute the first group of instructions.

2. The device as claimed in claim 1 wherein the second program comprises a plurality of groups of instructions, including the first group of instructions, and each group of instructions comprises next instructions which instruct the processing means which instructions to execute next.

3. The device as claimed in claim 2 further comprising:
   jump table means comprising a plurality of conditions and a plurality of variable addresses, each condition being associated with only one variable address;
   wherein each variable address identifies a memory location in the memory means or the transposable memory means containing the next instruction; and
   wherein the variable addresses can be changed by the next instructions of the second program.

4. The device as claimed in claim 3 wherein the plurality of conditions are dependent on the input signals generated by the user-activatable input means.

5. The device as claimed in claim 4 wherein when the variable address for the next instruction identifies a memory location located in the transposable memory means, the processing means transfers the group of instructions sequentially stored in the transposable memory means commencing with the memory location identified by the variable address to the memory means.

6. The device as claimed in claim 5 wherein one of the plurality of conditions is a time condition which is satisfied if no input signals are generated in a predetermined time period.

7. The device as claimed in claim 6 wherein the memory means comprises non-volatile memory means for storing the first program and volatile memory means for storing instructions of the second program from the transposable memory means; and wherein the processing means stores data in the volatile memory means and transfers data from the volatile memory means to the transposable memory means in response to instructions from the first program or the second program.

8. The device as claimed in claim 7 further comprising display means for displaying symbols in response to display signals sent by the processing means.

9. The device as claimed in claim 8 wherein the device is a combination wrist watch and user-interactive monitoring device further comprising:

fastening means for fastening the device to a user's wrist;

wherein said processing means comprises clock means operable to measure time and for measuring the predetermined time period; and wherein the body case is a watch case and the first program comprises instructions for the processing means to operate the device as a wrist watch and send display signals which display time.

10. The device as defined in claim 9 wherein the transposable memory means comprises:

a single non-volatile memory chip for storing and retrieving data and instructions;

plug-in circuit means for electrically coupling the memory chip to the connecting means; and plug-in module means for containing the memory chip and the plug-in circuit means and formed to releasably connect the transposable memory means to the connecting means of the body case.

11. The device as claimed in claim 10 wherein the input means comprises first activating means and second activating means located on the body casing such that input signals are generated when the first activating means or the second activating means are activated by a user.

12. The device as claimed in claim 11 wherein the second program comprises a behavioral modification program for promoting alternative responses to the acquired behavioral responses:

wherein the first group of instructions comprise instructions to display a symbol representing an alternative response to the acquired behavioral response and the first group of instructions are sequentially stored in the transposable memory means commencing at a first memory location having a first address;

wherein, upon initialization, the first program sets the jump table means to an original setting such that the variable address is the first address for each condition; and wherein activation of any one of the activation means in response to an occurrence of an urge of the user to perform an acquired behavioral response causes the processing means to transfer the first group of instructions from the transposable memory means and display the first alternate response symbol.

13. The device as claimed in claim 12 wherein the next instructions of the first group of instructions instruct the processing means to transfer subsequent groups of instructions from the transposable memory means, said subsequent groups of instructions comprising instructions to display symbols representing alternative responses to the acquired behavioral response and prompting signals; and wherein one of the first or subsequent groups of instructions sets the jump table means such that a first variable address, corresponding to activation of the first activation means, identifies a group of instructions sequentially stored in the transposable memory means which instruct the processing means to display a positive symbol and a second variable address, corresponding to activation of the second activation means, identifies a group of instructions sequentially stored in the transposable memory means which instruct the processing means to display a negative symbol.

14. The device as claimed in claim 13 wherein the group of instructions to display a positive symbol also instruct the processing means to store in the volatile memory means and the transposable memory means that the user selected one of the alternative responses; and wherein the group of instructions to display a negative symbol also instruct the processing means to store in the volatile memory means and the transposable memory means that the user selected the acquired behavioral response; and wherein the next instruction of both groups of instructions return the jump table means to the original setting and resume execution of the first program.

15. The device as claimed in claim 14 wherein each group of instructions are stored in about an equal number of memory locations; and wherein the volatile memory means has sufficient memory locations to store at least one of the groups of instructions of the second program.

16. The device as defined in claim 14 wherein the acquired behavioral response is over-eating and the alternative response symbols represent alterative responses to over-eating.

17. The device as defined in claim 14 wherein the acquired behavioral response is smoking and the alternative response symbols represent alternative responses to smoking.

18. The device as claimed in claim 10 wherein the transposable memory means can be electrically coupled to an other portable electronic device substantially identical to the portable electronic device such that the other portable electronic device can execute the second program stored on the transposable memory means and retrieve data stored in the transposable memory means.

19. The device as claimed in claim 10 wherein the transposable memory means can be electrically coupled to a host computer having connecting means and a second processing means corresponding to the connecting means and the processing means of the portable electronic device; and wherein the second processing means transfers data and instructions to and from the host computer and the transposable memory means.

20. The device as claimed in claim 2 wherein the next instructions can instruct the processing means to execute instructions from the first program or transfer other groups of instructions of the second program from the transposable memory means to the memory means and execute those instructions.

* * * * *